US012627248B2

(12) United States Patent
Kalender et al.

(10) Patent No.: US 12,627,248 B2
(45) Date of Patent: May 12, 2026

(54) INJECTION MOULDING MACHINE WITH ELECTRIC SWITCHING UNITS AND METHOD FOR SYNCHRONISING THE CURRENTS OF ELECTRIC SWITCHING UNITS

(71) Applicant: WITTMANN TECHNOLOGY GMBH, Vienna (AT)

(72) Inventors: Tomas Kalender, Wolfpassing a.d. Hochleithen (AT); Klaus Bergkirchner, Vienna (AT); Christoph Friedrich, Vienna (AT)

(73) Assignee: WITTMANN TECHNOLOGY GMBH, Vienna (AT)

( * ) Notice: Subject to any disclaimer, the term of this patent is extended or adjusted under 35 U.S.C. 154(b) by 253 days.

(21) Appl. No.: 18/562,728

(22) PCT Filed: May 20, 2022

(86) PCT No.: PCT/AT2022/060175
§ 371 (c)(1),
(2) Date: Nov. 20, 2023

(87) PCT Pub. No.: WO2022/241499
PCT Pub. Date: Nov. 24, 2022

(65) Prior Publication Data
US 2024/0235446 A1 Jul. 11, 2024

(30) Foreign Application Priority Data
May 21, 2021 (AT) .............................. A 50407/2021

(51) Int. Cl.
*H02P 27/08* (2006.01)
*H02P 23/00* (2016.01)
(Continued)

(52) U.S. Cl.
CPC ............ *H02P 23/00* (2013.01); *H02P 25/022* (2013.01); *B29C 45/76* (2013.01); *B29C 2945/76033* (2013.01); *B29C 2945/76525* (2013.01)

(58) Field of Classification Search
CPC ........ H02P 23/00; H02P 25/022; H02P 27/08; H02P 21/22; H02M 1/123; H02M 1/126; H02M 7/493; B29C 45/03
See application file for complete search history.

(56) References Cited

U.S. PATENT DOCUMENTS

| | | | |
|---|---|---|---|
| 5,325,285 A | 6/1994 | Araki | |
| 5,450,309 A | 9/1995 | Rohner | |
| (Continued) | | | |

FOREIGN PATENT DOCUMENTS

| | | | |
|---|---|---|---|
| CN | 105634363 A | 6/2016 | |
| CN | 108199576 A | 6/2018 | |
| (Continued) | | | |

OTHER PUBLICATIONS

ISA European Patent Office, International Search Report Issued in Application No. PCT/AT2022/060175, Aug. 16, 2022, WIPO, 5 pages.

(Continued)

*Primary Examiner* — Muhammad S Islam
(74) *Attorney, Agent, or Firm* — McCoy Russell LLP

(57) ABSTRACT

The invention relates to an injection moulding machine having: an electric machine; multiple switching units electrically connected in parallel, wherein each switching unit has at least one electrical output and at least one electrical switch associated with the output, wherein corresponding outputs of the switching units are electrically connected in parallel with a common output; at least one primary open-loop and/or closed-loop controller which is designed to control the switching units with control signals in order to operate the electric machine; a measuring device for measuring output currents at the outputs; and at least one correction controller which is designed to adjust a corre- (Continued)

Figure 1:
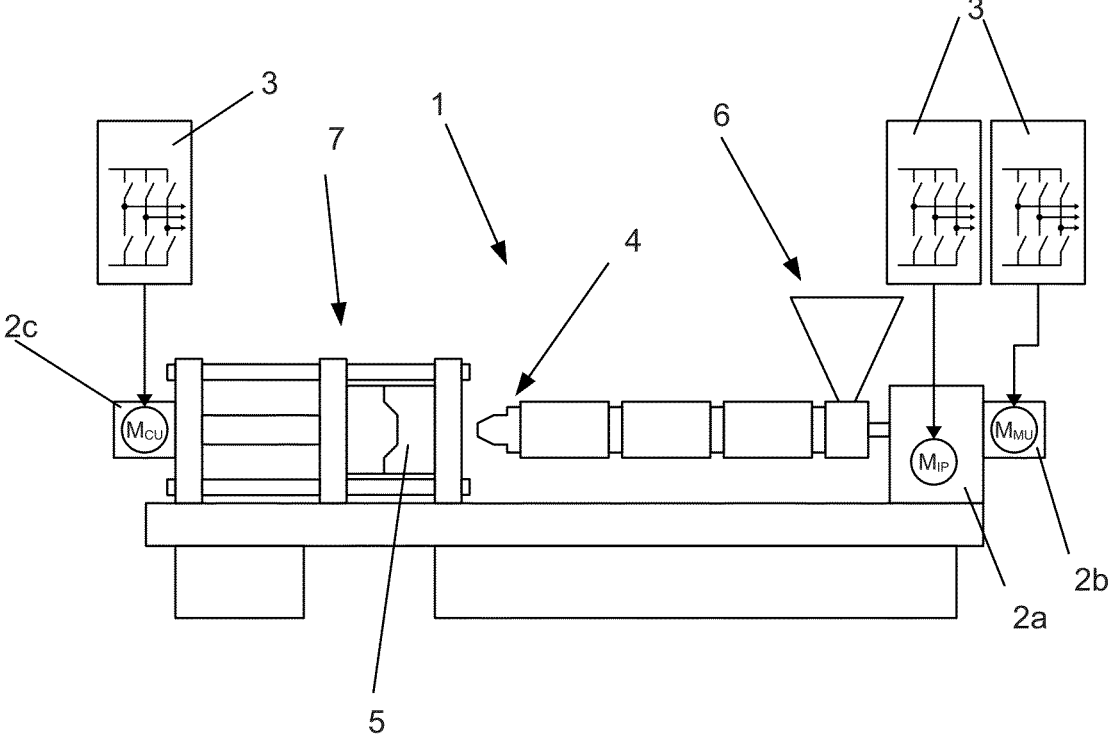

sponding control signal in the event of a deviation between a measured output current at an output and a target value.

14 Claims, 5 Drawing Sheets

(51) Int. Cl.
  *H02P 25/022*          (2016.01)
  *B29C 45/76*           (2006.01)

(56)                    References Cited

U.S. PATENT DOCUMENTS

| | | | |
|---|---|---|---|
| 7,138,773 | B2 | 11/2006 | Kumar |
| 2007/0035263 | A1 | 2/2007 | Rastogi et al. |
| 2019/0393801 | A1* | 12/2019 | Agirman ................. H02P 27/08 |

FOREIGN PATENT DOCUMENTS

| | | | |
|---|---|---|---|
| DE | 112016004632 | T5 | 6/2018 |
| EP | 2408099 | A2 | 1/2012 |
| JP | 2002335696 | A | 11/2002 |
| JP | 2011193714 | A | 9/2011 |
| JP | 5447400 | B2 | 3/2014 |
| WO | 2020246021 | A1 | 12/2020 |

OTHER PUBLICATIONS

China National Intellectual Property Administration, Office Action and Search Report Issued in Application No. 202280036559.2, May 1, 2024, 7 pages.

\* cited by examiner

INJECTION MOULDING MACHINE WITH ELECTRIC SWITCHING UNITS AND METHOD FOR SYNCHRONISING THE CURRENTS OF ELECTRIC SWITCHING UNITS

The invention relates to an injection moulding machine with at least one electrical machine, in particular a rotating field machine, and at least one switching unit, in particular an inverter unit.

Furthermore, the invention relates to the method for synchronising output currents of switching units electrically connected in parallel, in particular inverter units, in an injection moulding machine.

Injection moulding machines for the production of parts made of plastic or other materials exist in different sizes and variants. When developing such machines, manufacturers strive to design components that can be used as universally as possible, function reliably and are at the same time inexpensive. Ideally, the parts produced should be scalable to meet different requirements and require only minor adjustments to use at different points on an injection moulding machine.

Injection moulding machines usually have multiple electrical machines for actuating various components and units. For example, there may be a motor for a clamping unit, a motor for an injection piston and a motor for a plasticising unit. Electric switching units, in particular inverter units, are used to drive the motors. The electrical power of the switching units must be adjusted to the electrical power of the electrical machine. However, the higher the required power, the larger and more expensive the switching units become. It would therefore be desirable to have universally applicable switching units available that are scalable and at the same time inexpensive.

It is known from the state of the art that switching units can be connected in parallel, thereby dividing the energy flows among the individual switching units. This allows an electrical machine of high power to be operated with multiple switching units of lower power. Depending on the demand for electrical power, the number of switching units connected in parallel can be increased or decreased. This is in line with the above-mentioned desire for standardisation and scalability.

However, since the currents output by switching units connected in parallel sometimes deviate considerably during operation, correspondingly large chokes with high inductance must be used at the outputs of the switching units to compensate for these differences and the current pulse peaks that occur during switching. However, large chokes are expensive and take up a lot of space. In addition, downstream chokes have the disadvantage that they can limit the bandwidth of any current control. Chokes with high inductance limit the bandwidth more.

From U.S. Pat. No. 7,138,773 B2 inverter units connected in parallel with high power ratings for controlling asynchronous motors in vehicles are known. Using a complicated algorithm based on multiple parameters and input variables, the switching times of switches in the inverters that switch too early are delayed in order to synchronise the switches contained in the inverter units. The switches of U.S. Pat. No. 7,138,773 B2 are configured as IGBTs or GTOs and are designed for high currents. For this reason, the switches of U.S. Pat. No. 7,138,773 B2 switch very slowly compared to other types of switches. As a drawback, the actual switching of the switches must be monitored, and the output voltage measured in order to execute the algorithm. This requires precise and complex monitoring of the switching edges. Another disadvantage is that the system of U.S. Pat. No. 7,138,773 B2 is designed for vehicles and the used switches switch comparatively slowly due to their design for high currents. This means that it is not possible to achieve such high precision and dynamics in the control of electrical machines as is required for injection moulding machines.

It is therefore the object of the present invention to eliminate or at least partially alleviate the disadvantages of the state of the art. It is preferably the object of the present invention to provide an injection moulding machine with switching units for controlling electrical machines, in which the chokes for compensating differences in the output currents of the switching units connected in parallel can be kept as small as possible in size or can even be omitted altogether.

This object is first solved by an injection moulding machine according as described herein.

An injection moulding machine according to the invention therefore comprises:

at least one electrical machine, in particular a synchronous motor;

multiple switching units electrically connected in parallel, in particular inverter units, which are designed to drive the electrical machine, wherein each switching unit has at least one electrical output and at least one electrical switch which is associated with the output and can be switched in accordance with a switching pattern, wherein corresponding outputs of the switching units are electrically connected in parallel to a common output which is connected to the electrical machine;

at least one primary open-loop and/or closed-loop control which is designed to control the switching units with control signals in order to operate the electrical machine;

a measuring device for measuring output currents at the outputs of the switching units; and at least one correction controller which is designed to adjust an corresponding control signal in the event of a deviation between a measured output current at an output and a target value such that switching times—specified by the switching pattern—of the at least one switch, which is associated with the relevant output, are temporally shifted forwards or backwards, ultimately reducing the deviation between the output current and the target value.

Advantageously, the invention allows for adjustment of the output currents of the switching units to one another, reducing the inductance of the required chokes for parallel connections of switching units and ultimately reducing their size or omitting the chokes altogether. Typically, chokes in the state of the art have values around or exceeding 1 mH. In this invention chokes and other inductive components for smoothing the output currents can be omitted altogether or smoothing inductance elements can be used with an inductance lower by a factor of 100-1000 than the state of the art. The invention here lies in the knowledge that even when identical switching units are used, the output currents deviate from each other because the impedances in the individual current paths, the signal propagation times of the control signals, and the switching times of the switches differ from each other despite all engineering efforts to compensate for these differences. However, the at least one used correction controller advantageously compensates for the mentioned differences by correspondingly adjusting the control signal of a switching unit in the event of a deviation of an output current from a target value. The switching times, in particular the switching edges, of switches that are associated with corresponding outputs are essentially synchronised by the at least one correction controller such that they switch simultaneously. In other words, the differences in the switching times of the switches are compensated. It is preferable if both rising and falling switching edges of all switches associated with corresponding outputs can be synchronised. The rising and falling edges can be adjusted independently of each other. In a preferred variant of the invention, the at least one correction controller can shift switching edges forward or backward in time by up to 60 ns. In a preferred embodiment, the deviation of switching times of switches, that are associated with corresponding outputs, after synchronisation is lower than the rise time of the switches, preferably lower than half, in particular lower than 25%, lower than 20%, lower than 15% or lower than 10% of the rise time of the switches. Remaining transient differences among the output currents of corresponding outputs can be compensated by using smoothing inductance elements, preferably coherent ferrite elements. For instance, the rise time of the switch can be set between 50 ns and 150 ns. An exemplary rise time of IGBT switches is approx. 100 ns. It is preferable if the switching times of all switches associated with corresponding outputs deviate from each other by a maximum of 60 ns, preferably a maximum of 30 ns, a maximum of 20 ns or a maximum of 10 ns after synchronisation. Thanks to the precise synchronisation of switching times, it is unnecessary to use large smoothing chokes, as typically required in the state of the art. It is advantageous that the compensation can be carried out on the basis of ordinary current measurements; a complicated switching edge monitoring as in U.S. Pat. No. 7,138,773 B2 is not necessary. The at least one correction controller can, for example, be configured as a P, PI or PID controller. According to the invention, corresponding outputs of the switching units are electrically connected to each other to form a common output. The electrical machine can be connected to the common output(s). In this context, "corresponding" refers to outputs of the switching units that are intended to output the same output voltages and the same output currents, in other words that are controlled in the same way. In particular, "corresponding" refers to outputs that are associated with the same outer conductors ("phases"). If, for example, the switching units are configured as inverter units with three outputs each ("three-phase"), all outputs for the outer conductor U ("phase U"), all outputs for the outer conductor V ("phase V") and all outputs for the outer conductor W ("phase W") of the inverter units are connected to each other. Thus, in this case there are three common outputs for the outer conductors U, V and W to which the electrical machine can be connected. Accordingly, all output currents, output voltages and connection lines of corresponding outputs are also designated as "corresponding" to each other. Preferably, voltage default signals are used as control signals for the switching units. The voltage default signals specify the output voltages to be output at an output of a switching unit. The voltage default signals enable the switching units to derive which output voltages are to be output at the outputs and to generate a corresponding switching pattern, in particular a PWM switching pattern (PWM: pulse width modulation), for the at least one switch. For this purpose, the switching units can each have one or more modulators that generate the PWM switching pattern in accordance with which the at least one switch is switched. In contrast to U.S. Pat. No. 7,138,773 B2, the at least one correction controller is designed to adjust the control signal before the switching pattern is generated or derived from the control signal. Therefore, it is advantageous that there is no requirement for switching edge monitoring as in the case of the state of the art. A current measurement of a corresponding output current is sufficient. The control signals are provided by a primary open-loop and/or closed-loop control for the electrical machine. Preferably, a primary open-loop control is used. In particular, a current control, preferably in a coordinate system based on space vector representation, can be used. The output currents of the switching units can be made available to the primary open-loop control as measured variables. For example, all output currents of the switching units can be made available to the primary open-loop control as measured variables. Alternatively, it can also be provided that only one output current of all corresponding output currents of the switching units is made available to the primary open-loop control as a measured variable. In this case, it can be assumed that all corresponding output currents are essentially identical. The control signals of the primary open-loop and/or closed-loop control can be adjusted by at least one correction controller before they are fed to the switching units. If a switching unit has multiple outputs, a dedicated control signal or control signal line can be provided for each output to transmit control signals to the switching units. The control signal lines do not have to be physically present but can also be implemented in software. The switching units are preferably configured in the same way. In a preferred embodiment, the switching units are configured as similar inverter units with three outputs each. Three control signal lines are thus preferably associated with each inverter unit. Alternatively, the switching units can also be formed, for example, by switchable half-bridges, step-down converters, or step-up converters. Multiple correction controllers can be provided, which are associated with different outputs. If a correction controller is associated with an output, the corresponding output current is measured. In particular, if more than two switching units and/or multiple outputs each are provided at the switching units, as is typically the case with three-phase inverter units, multiple correction controllers can also be provided, which adjust the corresponding control signals in the event of a deviation. The correction controller(s) can be implemented in particular by software. The at least one switch of a switching unit is switched in accordance with a switching pattern at predetermined switching times, such that essentially the predetermined output voltage or the predetermined output current is output at the output associated with the switch. The switching pattern is preferably formed by a PWM (pulse width modulation). By adjusting the control signal by the at least one correction controller, the switching pattern derived therefrom is subsequently changed and thus the output voltage at a corresponding output of the switching unit is changed. This adjusts the output currents to the target value. The switching times of the switches of corresponding switching units are thus synchronised. Preferably, at least two switches, which are connected to form a half-bridge, are associated with each output. The electrical machine is preferably a rotating field machine. The electrical machine is particularly preferably configured as a synchronous motor or as an asynchronous motor. Multiple switching units means at least two, preferably at least three switching units. The primary open-loop and/or closed-loop control and the at least one correction controller can be implemented in a microprocessor. The switching units can form an assembly. The assembly is preferably integrated in a device, for example in a device with a common housing. The switching units of an assembly can be mounted on a common printed circuit board. At least three switching units, in particular inverter units, are combined into one assembly in a preferred embodiment. The microprocessor(s) for the primary open-loop and/or closed-loop control, the at least one correction controller and the measuring device can also be part of the assembly and, for example, also be mounted on the common printed circuit board. Such an assembly can be manufactured in large quantities and is universally applicable in injection moulding machines. For example, all switching units of an assembly can be connected in parallel and operated as described to drive an electrical machine. However, if not all switching units are needed to operate a single electrical machine, the switching units that are not needed can be used to operate another electrical machine. Therefore, besides switching units connected in parallel, other switching units, in particular of the same type, can also be present in the assembly. In an embodiment, the impedance between the corresponding outputs of a switching unit and the common output is identical. It is beneficial if the DC link voltage supplying the switches of the switching units is identical for all switches. Output currents can be smoothed with very small smoothing inductance elements, smaller than 5 pH.

In a preferred embodiment, n switching units are provided and a correction controller is associated with each output of at least n−1 switching units, which adjusts a corresponding control signal if the measured output current at the output deviates from a target value. "n" being a natural number and denoting the number of switching units. This embodiment enables, for example, the adjustment of the output currents of n−1 switching units to the corresponding output currents of the $n^{th}$ switching unit. Alternatively, each output of the n switching units can be associated with its own correction controller. In this way, all output currents of all switching units can be adjusted in accordance with a target value.

A particularly simple variant for adjusting the control signal is obtained when the at least one correction controller is designed to connect an offset signal value to the control signal in order to adjust the control signal. If multiple correction controllers are provided, all correction controllers can each connect an offset signal value to a control signal for an output. The offset signal value can be added to or subtracted from the control signal. The offset signal value is connected to the control signal before it is received by the switching unit. In particular, the at least one correction controller is designed to apply the offset signal value to the control signal before a switching pattern is derived from it. The offset signal value can take on positive or negative values or even be zero.

In order to shorten the settling time of the at least one correction controller when the electrical machine or the injection moulding machine is restarted, a memory, in particular a non-volatile memory, can be provided in which the offset signal value or a temporal average value thereof can be stored. If multiple correction controllers are provided, they can store the offset signal values in the memory. In the case of an embodiment, it is advantageous if the offset signal values can already be stored in the memory during the production of the switching units. The offset signal values can therefore already be determined during the production of the switching units and stored in the memory.

In order to be able to operate rotating field machines as electrical machines, it is beneficial if the switching units are configured as inverter units and each have at least two, preferably at least three, electrical outputs. In a particularly preferred embodiment, at least three inverter units with three outputs each, i.e., at least three three-phase inverter units, are provided.

In an embodiment of the invention, it is provided that n switching units are provided and one of the switching units represents a reference switching unit and a correction controller, in particular a P, PI or PID controller, is associated with all outputs of the other n−1 switching units, the correction controllers being designed in each case to adjust a control signal of the n−1 switching units in such a way that the output currents of the n−1 switching units correspond to the respective corresponding output currents of the reference switching unit. "n" being a natural number and denoting the number of switching units. This embodiment has the advantage that correction controllers for the output currents of the reference switching unit can be omitted, thus reducing effort and computing time. Therefore, no correction controllers are associated with the outputs of the reference switching unit. The correction controllers at the outputs of the other n−1 switching units use the output currents of the reference switching unit corresponding to the respective output currents of the n−1 switching units as target values.

In an alternative embodiment, it is provided that a correction controller, in particular a P, PI or PID controller, is associated with all outputs of all switching units, wherein these correction controllers are each designed to adjust a control signal of the switching units in such a way that the output currents of the switching units correspond to an averaged total current from the respective output current and all corresponding output currents. In other words, in this embodiment, an averaged total current is formed from all corresponding output currents and the control signals are adjusted by the correction controllers in such a way that the output currents correspond to the respective averaged total current from corresponding output currents. The total current is averaged by dividing the total current by the number of switching units. The total current itself can be determined by adding the measured corresponding output currents.

In an embodiment, connecting lines may be used to connect corresponding outputs of the switching units to their respective common outputs, wherein the connecting lines of corresponding outputs are guided through at least one smoothing inductance element to smooth the output currents. The precise synchronisation of the switching times in the present invention allows the at least one smoothing inductance element to be significantly smaller than in the state of the art. It is advantageous if transient transitions that occur for a short time are smoothed. In order to smooth transient transitions, the inductance value of the at least one smoothing inductance element can be kept low, preferably below 5 pH. In comparison, smoothing inductance elements in the state of the art typically have an inductance value in the range of 1 mH that is larger by a factor of 100-1000. Also, the size of the smoothing inductance elements used in the state of the art is typically larger by a factor of 100-1000 than the at least one smoothing inductance element that can be used in the present invention. This is because harmonics above the fundamental frequency are to be compensated for in the state of the art. In a preferred embodiment, the inductance of the smoothing inductance element is less than 5D1H. Preferably, a coherent ferrite element, in particular a ferrite ring, is provided as a smoothing inductance element. It is advantageous if the at least one smoothing inductance element is current-compensated, such that magnetic fields in the smoothing inductance element cancel each other out and thus prevent magnetic saturation of the element. Current-compensated smoothing inductance elements have output currents flowing through them in opposite directions such that the magnetic fields substantially compensate when the currents are substantially equal. The use of a current-compensated smoothing inductor provides an advantage in the suppression of common mode interference. In this embodiment, the connection lines of corresponding outputs of the switching units are guided through smoothing inductance elements. Since corresponding output currents are already adjusted to each other by the at least one correction controller and thus there are no or at most only minor differences between corresponding output currents, the at least one smoothing inductance element can be small and thus inexpensive.

The smoothing inductance element is preferably formed by a common-mode choke or a preferably self-contained, in particular annular, magnetic core element. The magnetic core element can, for example, be made of ferrite or metal, in particular iron or iron powder. Preferably, a coherent ferrite element, in particular a ferrite ring, is provided as a smoothing inductor. Such a ferrite element can have a weight of less than 40 g. The ferrite element can have an outer diameter of less than 40 mm, in particular less than 30 mm. The common-mode choke has two windings wound in opposite directions. Preferably, the smoothing inductance elements are integrated into a terminal block with terminals to which the motor can be connected.

In a particularly preferred embodiment, it is provided that each connection line is guided through a smoothing inductance element at least once together with the connection line of another corresponding output, preferably at least once together with the connection line of each other corresponding output, the connection lines preferably being guided through the smoothing inductance element in opposite directions. Preferably, the smoothing inductance element is a ferrite core element. "In opposite directions" means that the connection lines with opposite current directions are guided through a smoothing inductance element. It is advantageous that the constant currents cancel each other out and deviations are compensated by the inductance. This can be achieved, for example, by having the smoothing inductance elements have windings with different sense of winding or, in the case of magnetic core elements, by guiding the connecting leads through the magnetic core element on opposite sides of each other. It is preferable that each connection line is guided through a smoothing inductance element at least once with the connection line of each other corresponding output. In an alternative embodiment, it can be provided that of k connecting lines, k–1 connecting lines are guided through a smoothing inductance element in opposite directions exactly once each with a further corresponding connecting line, and the $k^{th}$ connecting line is guided through a smoothing inductance element in opposite directions with two further corresponding connecting lines.

The object according to the invention is also solved by a method for synchronising output currents of switching units electrically connected in parallel, in particular inverter units, according to claim 11.

In this method, the switching units are connected to an electrical machine of an injection moulding apparatus, each switching unit having at least one electrical output and at least one electrical switch associated with the output, which is switched in accordance with a switching pattern, wherein corresponding outputs of the switching units are electrically connected in parallel to a common output for the electrical machine. According to the invention, the method has the following steps:

outputting control signals to the switching units;
    measuring output currents at the outputs of the switching units;

comparing at least a measured output current with a target value for each output current;
    adjusting a corresponding control signal by at least one correction controller in the event of a deviation between the measured output current and the target value, such that the switching times, which are predetermined by the switching pattern, of at least one switch associated with the relevant output are shifted forward or backward in time and the deviation between the target value and the output current is thereby reduced.

With regard to the advantages and design of the features of the method, reference is made to the explanations in connection with the injection moulding machine described above. Preferably, multiple output currents are measured, and each compared to target values, and the corresponding control signals are adjusted in the event of a deviation between an output current and a target value. For this purpose, multiple correction controllers are preferably provided, each of which is associated with an output. A measured output current can be compared with a target value, or a deviation can be determined by subtracting the measured output current from the target value. The control signal is adjusted by the at least one correction controller before a switching pattern, in particular a PWM switching pattern, is derived from the control signal.

In a preferred embodiment, it is provided that the at least one correction controller applies an offset signal value to the control signal to adjust the control signal. If multiple correction controllers are provided, which are associated with different outputs of the switching units, these can each apply offset signal values to corresponding control signals. The at least one correction controller applies the offset signal value to the control signal before a switching pattern is derived from it.

In a further development of the invention, it is provided that the offset signal value or a temporal average value thereof is stored in a memory, in particular a non-volatile memory, such that the offset signal value or its temporal average value is available when the method is used again. With this embodiment, for example, an offset signal value can already be determined during the production of an injection moulding machine. The determined offset signal value can then be stored in the memory such that the settling time of the correction controller can be shortened. An offset signal value determined and stored in this way can always be available when the method is restarted.

An efficient design of the method results if n switching units are provided and one of the switching units represents a reference switching unit, wherein a correction controller is associated with each output of the other n–1 switching units and the target value of all output currents of the other n–1 switching units are formed by the output currents of the reference switching unit corresponding to the respective output currents of the n–1 switching units. "n" being a natural number and denoting the number of switching units.

In an alternative design of the invention, it can be provided that a correction controller is associated with each output and an averaged total current from the respective output current and all corresponding output currents is used as the target value for each output current.

Figure 2:
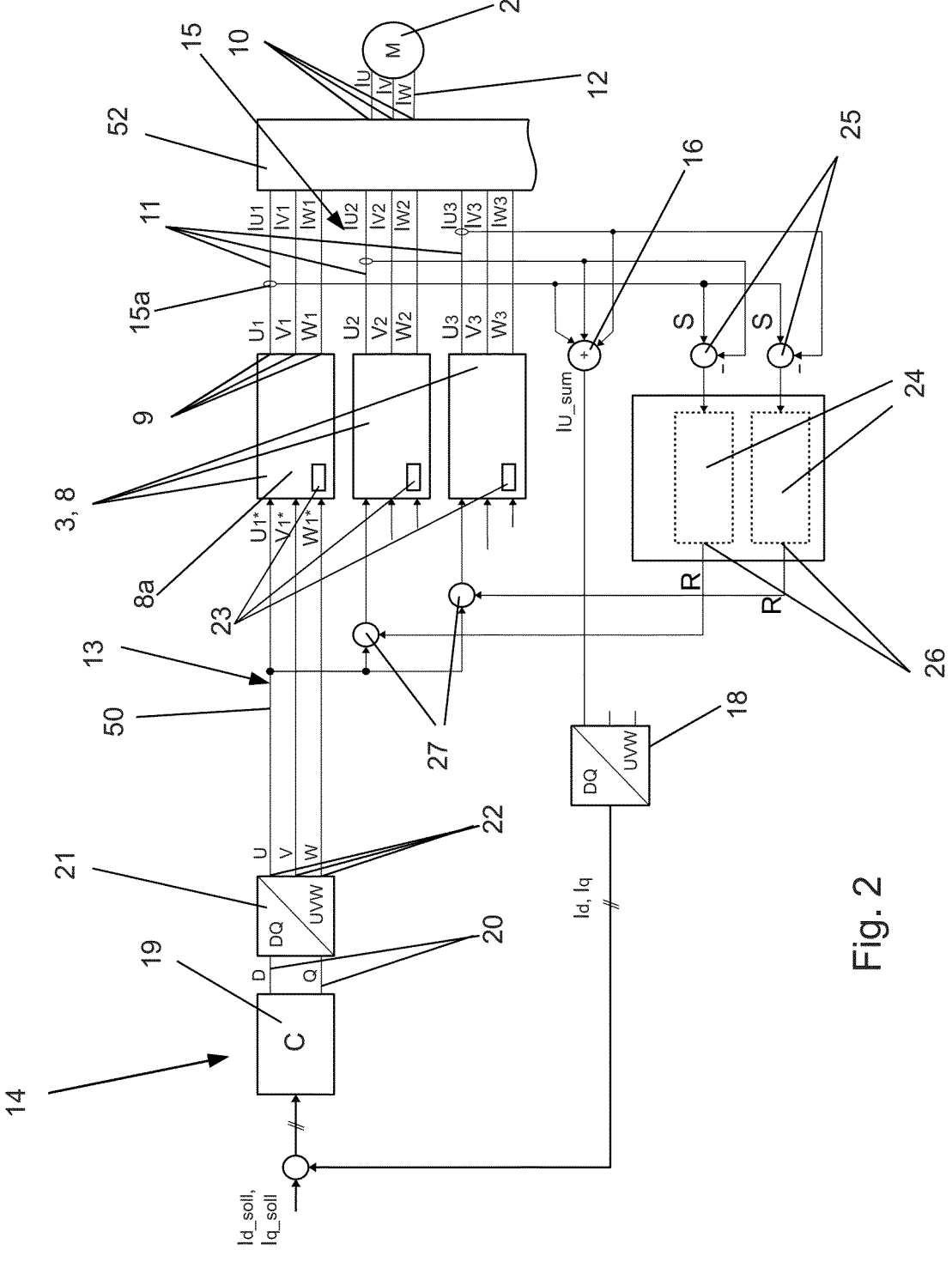
Figure 3:
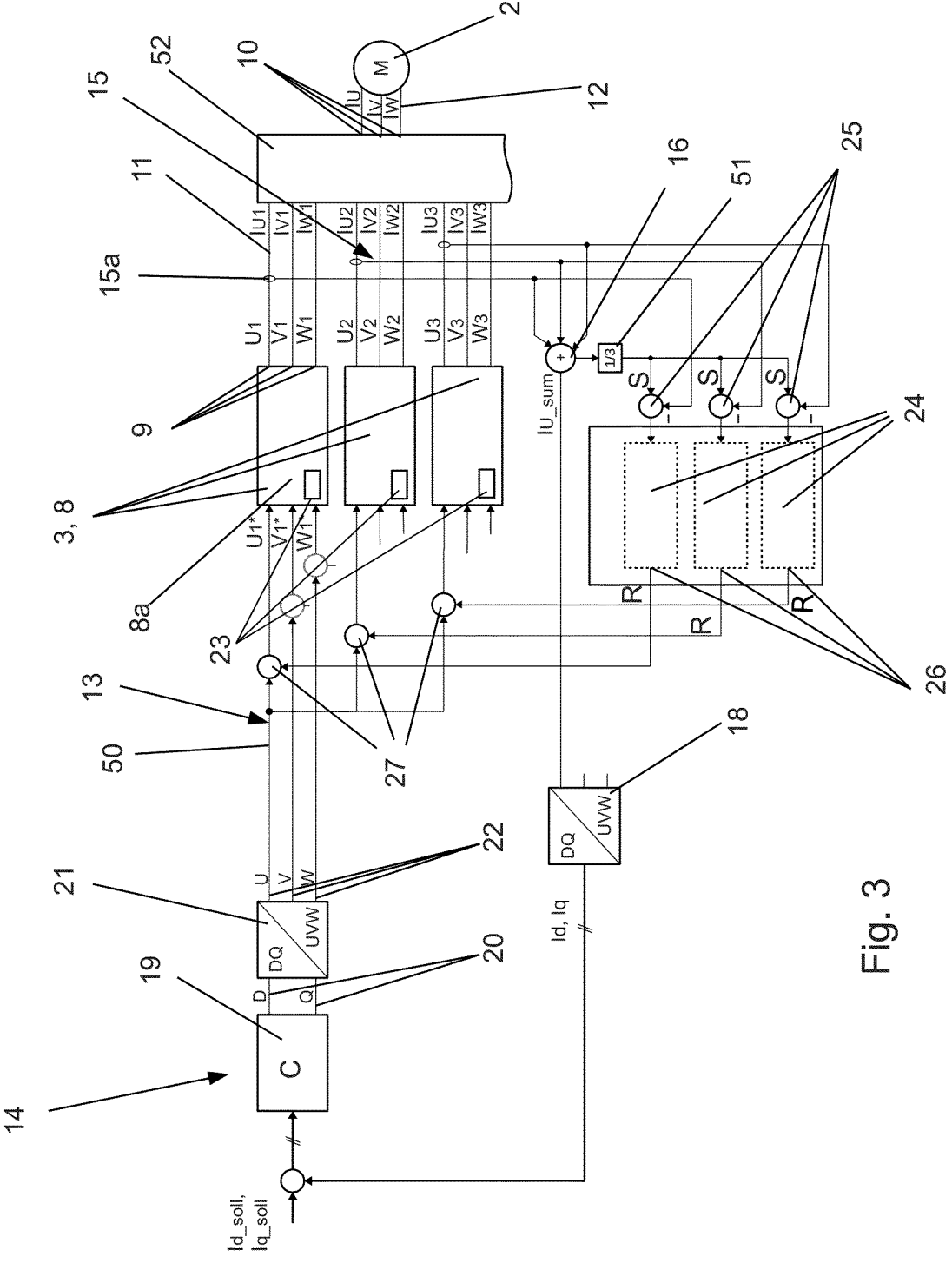
Figure 5:
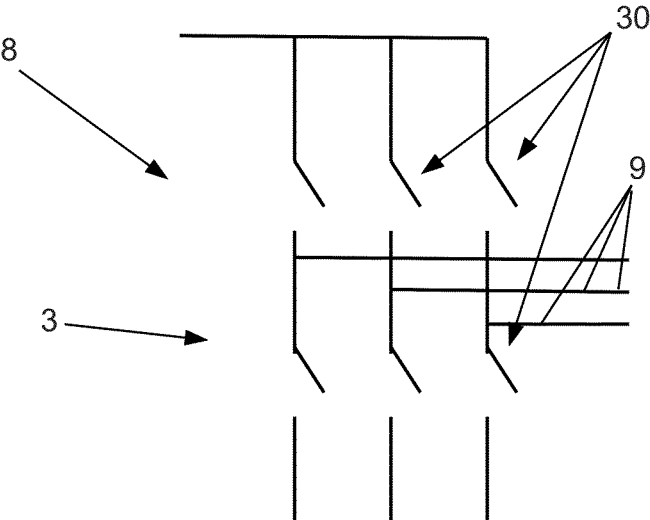

The invention is described below with the help of figures to which it is not intended to be limited. It shows:

FIG. 1 a schematic side view of an all-electric injection moulding machine from the state of the art;
    FIG. 2 an electrical block diagram of the invention in accordance with a first embodiment;

FIG. 3 an electrical block diagram of the invention in accordance with a second embodiment;

FIG. 4A-D respective interconnections of connecting lines between switching units connected in parallel and common outputs with smoothing inductance elements;

FIG. 5 a switching unit; and

Figure 6:
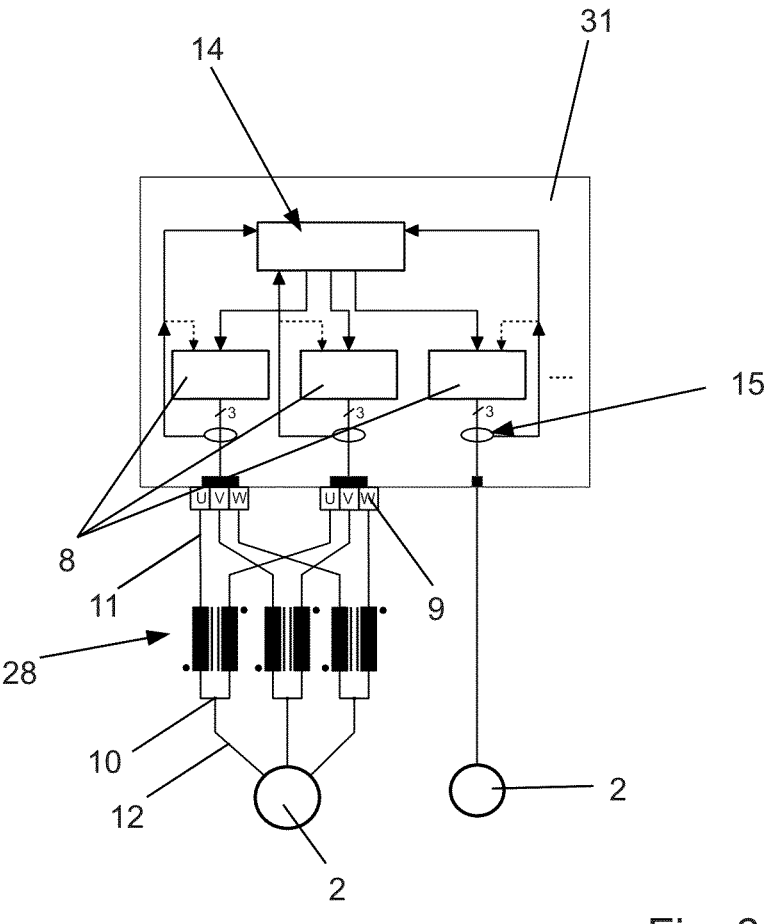

FIG. 6 multiple switching units.

FIG. 1 shows a schematic side view of an all-electric injection moulding machine 1 from the state of the art. The injection moulding machine 1 has multiple electrical machines 2, each of which is operated by individual inverter units 3. The electrical machine 2a drives an injection piston 4 for introducing material into a mould 5. The electrical machine 2b operates a plasticising unit 6 for preparing raw material. The electrical machine 2c operates a clamping unit 7 to open and close the mould 5.

Injection moulding machines 1 exist in different sizes and designs. Electrical machines 2 of different power and design are used. The powers of the associated inverter units 3 must be adjusted to the powers of the electrical machines 2, i.e. they must be able to output currents and voltages in the corresponding order of magnitude. However, the higher the powers, the more expensive and larger the inverter units become 3.

According to the invention, it is therefore intended to operate the electrical machines 2 each on switching units 8 electrically connected in parallel, as shown for example in FIG. 2. If higher powers are required, more switching units 8 are connected in parallel, which facilitates scalability. Advantageously, the individual powers of the switching units 8 can be lower than the power of the connected electrical machine 2. FIG. 5 shows an exemplary switching unit 8 in more detail.

FIG. 2 shows an electrical block diagram in accordance with a first embodiment of the invention. In FIG. 2, three (n=3) switching units 8 configured as inverter units 3 are electrically connected in parallel. The switching units 8 each have three outputs 9, which are associated with the outer conductors ("phases") U, V and W. Corresponding outputs 9 of the switching units 8, i.e., outputs 9 of the same outer conductors U, V and W, are electrically connected to each other via connecting lines 11 into common outputs 10. Each common output 10 is associated with an outer conductor U, V or W. The electrical machine 2 is connected to the common outputs 10 via motor connection lines 12. PWM-modulated output voltages are output at the outputs 9.

The switching units 8 are controlled via control signals 13. The control signals 13 are illustrated by $U_1^*$, $V_1^*$ and $W_1^*$. Each output 9 of each switching unit 8 is controlled via its own control signal 13. The control signals 13 are given by a primary closed-loop control 14, which is intended to control the output currents $I_{U1}$-$I_{W3}$ of the outputs 9 in the connection lines 11 and thus consequently the outer conductor currents $I_U$, $I_V$, $I_W$ in the motor connection lines 12. Sizes relating to the switching units 8 are provided with numbered indices in this disclosure of invention. In the embodiment shown, all output currents $I_{U1}$-$I_{W3}$ of the switching units 8 are measured with the aid of current measuring sensors 15a of a measuring device 15 and made available to the primary closed-loop control 14. For the sake of clarity, however, this is only shown for the outer conductor U. However, the statements apply analogously to the other outer conductors V and W. As shown in the embodiment, corresponding output currents $I_{U1}$-$I_{W3}$ are added in a sum block 16 to obtain the outer conductor currents $I_U$, $I_V$, $I_W$ (represented by total currents $I_{U\_sum}$, etc.) in the motor connection lines 12. This is only shown for the outer conductor U, the explanations for the other outer conductors V and W apply analogously. In an alternative embodiment, it can also be assumed for simplification that corresponding output currents $I_{U1}$-$I_{W3}$ of the outer conductors U, V, W are identical, such that only one output current $I_{U1}$-$I_{W3}$ of each outer conductor U, V, W must be fed back and multiplied by the number of switching units 8 to obtain the corresponding outer conductor current $I_U$, $I_V$, $I_W$. The outer conductor currents $I_U$, $I_V$, $I_W$ determined by summation and fed back are guided through a first coordinate transformation block 18 and transformed from the string size representation into a two-axis dq-coordinate system of the space vector representation such that transformed currents $I_d$, $I_q$ are obtained in the dq-coordinate system. The transformed currents $I_d$, $I_q$ are compared with a current specification $I_{d\_soll}$, $I_{q\_soll}$ as a reference variable, which is also specified in space vector representation in the dq-coordinate system. The deviation resulting from the comparison is fed to a current controller 19 which, on the basis of the deviation between the current specification $I_{d\_soll}$, $I_{q\_soll}$ and the transformed currents $I_d$, $I_q$ specifies manipulated variables 20 which are fed to a second coordinate transformation block 21 in order to obtain the manipulated variables 20 in string size representation for the outer conductors U, V, W. The transformed manipulated variables 22 are output to the switching units 8 connected in parallel. These may each have one or more modulators 23 to generate the (PWM) switching pattern for the switches 30. The modulators 23 can of course also be arranged in front of the switching units 8. The control signals 13 reach the switching units via control signal lines 50. This is fully shown for the outer conductor U. The control for the outer conductors V and W is analogous. The control signal lines 50 as well as the other blocks, such as the sum block 16, the modulator 23, the coordinate transformation blocks 18, 21 and the current controller 19, do not have to be physical lines or blocks. These can also be implemented in software, just like the correction controllers 24, which will be described in more detail.

If switching units 8 are connected in parallel, the corresponding output currents $I_{U1}$-$I_{W3}$, for example the output currents $I_{U1}$, $I_{U2}$ and $I_{U3}$, can deviate from each other despite the similar construction of the switching units 8 due to different switching times of the switches contained in the switching units 8, different impedances in the current paths of the output currents $I_{U1}$-$I_{W3}$ and different signal propagation times of the control signals 13. In order to reduce the deviations and current peaks caused by non-synchronised switching operations, large chokes with high inductance are used in the state of the art. However, such chokes take up a lot of space and are expensive.

According to the invention, at least one correction controller 24 is therefore provided, which is design to adjust a corresponding control signal 13 in the event of a deviation between a measured output current $I_{U1}$-$I_{W3}$ at an output 9 of a switching unit 8 and a target value S. By adjusting the control signal 13, the switching times of the at least one switch associated with the relevant output 9, which are predetermined by the switching pattern, are shifted forward or backward in time, thereby reducing the deviation between the target value S and the output current $I_{U1}$-$I_{W3}$. The output currents $I_{U1}$-$I_{W3}$ of the switching units 8 are kept equal by the at least one correction controller 24 and thus the switching times of corresponding switches 30 are also indirectly synchronised.

FIG. 2 shows a first embodiment of the invention. One of the n=3 switching units 8 is configured as the reference switching unit 8a. The control signals 13 of the other n−1 switching units 8 are to be adjusted in this embodiment in such a way that their output currents $I_{U2}$, $I_{U3}$, $I_{V2}$, $I_{V3}$, $I_{W2}$ and $I_{W3}$ correspond to the respective output currents $I_{U1}$, $I_{V1}$ und $I_{W1}$ of the reference switching unit 8a. For this purpose, correction controllers 24 are associated with all outputs 9 for the output currents $I_{U2}$, $I_{U3}$, $I_{V2}$, $I_{V3}$, $I_{W2}$ and $I_{W3}$ of the other n−1 switching units 8. In FIG. 2, only the correction controllers 24 for the outputs 9 or output currents $I_{U2}$, $I_{U3}$ associated with the outer conductor U are shown for the purpose of clarity. The output currents $I_{U2}$ and $I_{U3}$ should correspond to the output current $I_{U1}$ with the aid of the correction controllers 24 shown (the same applies to the output currents of the outer conductors V and W). The correction controllers 24 are therefore designed to adjust corresponding control signals 13 for the other n−1 switching units 8 in such a way that the output currents $I_{U2}$ and $I_{U3}$ are changed in the event of a deviation from the output current $I_{U1}$. For this purpose, the output current $I_{U1}$ is selected as the target value S for the correction controllers 24 shown. The deviation between an output current and a target value S can be determined by means of subtraction in a subtraction block 25. In the event of a deviation between one of the output currents $I_{U2}$ und $I_{U3}$ of the other n−1 switching units 8 and the corresponding output current $I_{U1}$ of the reference switching unit 8a, the correction controllers 24 shown apply a positive or negative offset signal value R to the corresponding control signals 13 in order to reduce or increase the PWM-modulated output voltage of the other n−1 switching units 8. The correction controller outputs 26 of the correction controllers 24 are connected to the control signal lines 50 via a summing block 27 for this purpose, such that the offset signal values R can be applied to the control signals 13. As already mentioned, the control signal line 50 does not have to be physically present but can be implemented in software. If the output currents $I_{U2}$ und $I_{U3}$ deviate from the output current $I_{U1}$ during operation, the correction controllers 24 shown detect these deviations and generate an offset signal value R such that the control signals 13 are adjusted accordingly and the deviations are thereby reduced. Preferably, the correction controllers 24 are configured as P, PI or PID correction controllers. The at least one correction controller 24 and the primary closed-loop control 14 may be implemented in one or more microprocessors in a discrete-time manner. The correction controllers for the outputs 9 associated with the output currents $I_{V2}$, $I_{V3}$, $I_{W2}$ and $I_{W3}$ are not shown in FIG. 2 for the sake of clarity; however, the statements about the correction controllers 24 shown also apply accordingly to these correction controllers. The correction controllers, which are not shown, thus also adjust corresponding control signals 13 by applying offset signal values R, such that the output currents $I_{V2}$ und $I_{V3}$ are adjusted to the output current $I_{V1}$ and the output currents $I_{W2}$ and $I_{W3}$ are adjusted to the output current Iwi of the reference switching unit 8a.

The offset signal values R or temporal averages thereof can be stored in particular in non-volatile memories (not shown). In this way, the settling times of the correction controllers 24 can be reduced when the method is used again or when the motor 2 is restarted. The offset signal values R can already be determined during the production of the switching units 8. In the case of PI controllers in particular, it can be provided that the integral components (I-components) of the correction controllers 24 are stored in a memory, in particular a non-volatile memory.

In the embodiment of FIG. 2, it is thus provided in summary that one of the switching units 8 represents a reference switching unit 8a and a respective correction controller 24 is associated with all outputs 9 of the other n−1 switching units 8, the correction controllers 24 being designed to adjust a respective control signal 13 of the other n−1 switching units 8 in such a way that the output currents $I_{U2}$-$I_{W3}$ of the other n−1 switching units 8 correspond to the respective corresponding output currents $I_{U1}$-$I_{W1}$ of the reference switching unit 8a.

FIG. 3 shows an alternative embodiment of the invention. Since the basic structure of the embodiment in accordance with FIG. 3 essentially corresponds to the structure of FIG. 2, only the differences will be discussed below. In FIG. 3, each output 9 of each switching unit 8 and thus each output current $I_{U1}$-$I_{W3}$ is assigned its own correction controller 24. For the sake of an overview, only the correction controllers 24 for the outputs 9 of the switching units 8 that are associated with the outer conductor U are shown. In contrast to the embodiment in accordance with FIG. 2, the embodiment in accordance with FIG. 3 does not have a reference switching unit 8a. The target value S for a correction controller 24 is formed by an averaged total current $I_{U\_sum}$ from all corresponding output currents $I_{U1}$-$I_{U3}$. The same applies to the correction controllers of the other outputs 9 of the switching units 8, which are not shown. Total currents can be averaged by adding the corresponding measured output currents $I_{U1}$-$I_{W3}$ and then dividing by the number of corresponding output currents. In FIG. 3 this is done by the division block 51. In FIG. 3, n=3 switching units are provided. In other words, in the embodiment of FIG. 3, the correction controllers 24 (shown and not shown) are each designed to adjust a control signal 13 of the switching units 8 in such a way that the output currents $I_{U1}$-$I_{uw3}$ of the switching units 8 each correspond to an averaged total current from the respective output current $I_{U1}$-$I_{W3}$ and all corresponding output currents $I_{U1}$-$I_{W3}$.

Figures 4A, 4B, 4C, 4D:
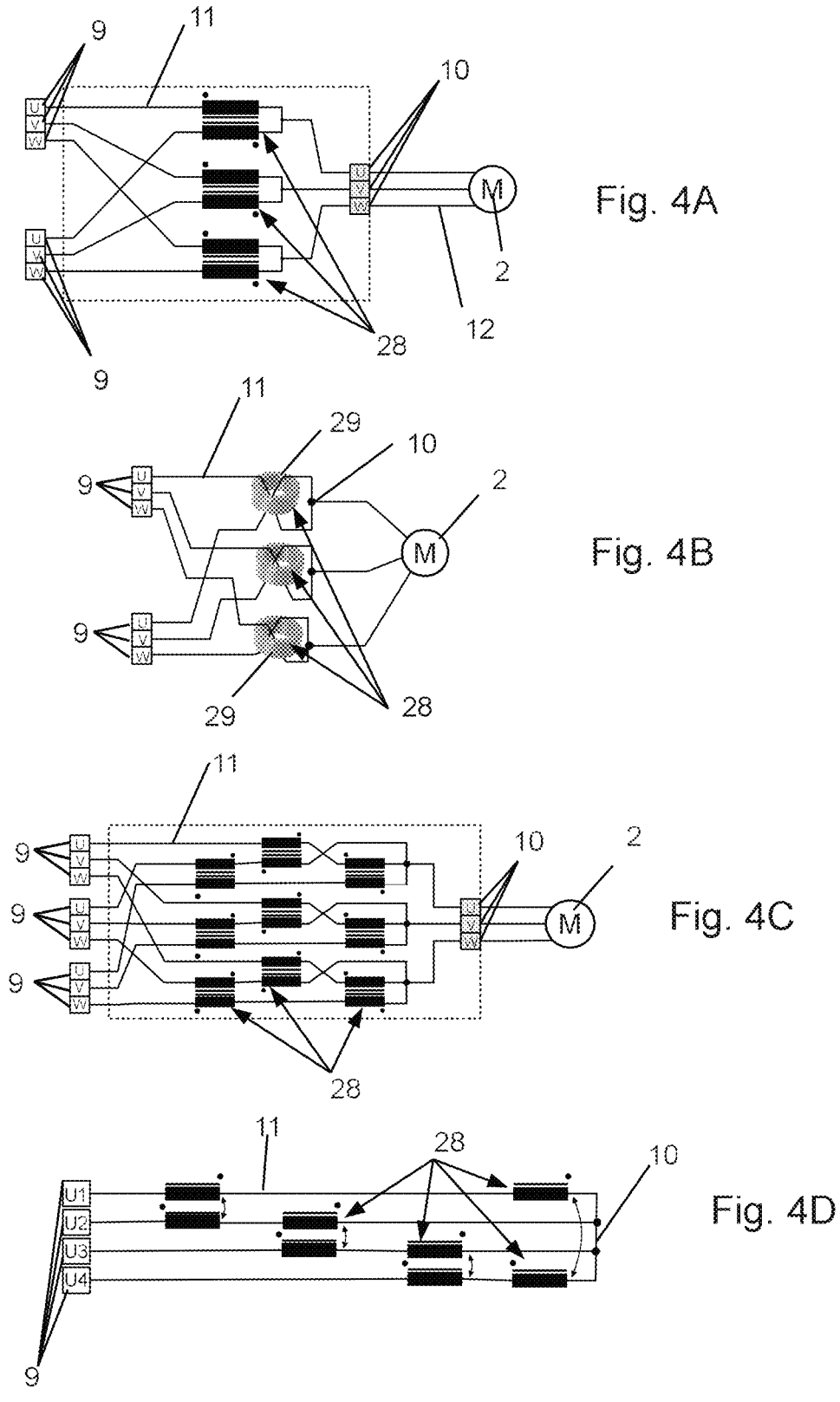

FIGS. 4A-C show the circuitry of the connection lines 11 to common outputs 10 in more detail. The circuitry can be made in a block 52 (see FIG. 2 and FIG. 3). With the correction controllers 24 described, it is possible to reduce deviations between the output currents $I_{U1}$-$I_{W3}$. In order to compensate for minor remaining deviations between the output currents and to smooth the output currents $I_{U1}$-$I_{W3}$ the connecting lines 11 may have smoothing inductance elements 28. FIG. 4A shows the situation with n=2 switching units 8. Two corresponding connection lines 11 are guided through a common smoothing inductance element 28, preferably in opposite directions. The smoothing inductance element 28 in FIG. 4A may, for example, be formed by a common mode choke (also referred to as a current compensated choke). A common mode choke has the advantage of compensating for magnetic fluxes due to the output currents flowing in opposite directions, such that the common mode chokes can be kept small in size. Common mode interference is suppressed.

FIG. 4B shows that two corresponding connection lines 11 are guided in opposite directions through a common smoothing inductance element 28 in the form of a preferably ring-shaped magnetic core element 29. They can be coherent ferrite rings. By passing the connecting lines 11 through a magnetic core element 29 in opposite directions, the magnetic fields cancel each other out as in a common mode choke. For example, a magnetic core element 29 can be a ferrite core element. Of course, other materials are also conceivable, such as, for example, magnetic core elements made of metal, in particular iron or iron powder. The magnetic core elements 29 do not saturate due to the cancellation of the magnetic fields generated. Common mode interference is suppressed.

FIG. 4C shows the situation for n=3 switching units. It can be seen that each connection line 11 is guided at least once together with the connection line 11 of each other corresponding output 9 through a smoothing inductance element 28, for example a common mode choke, wherein the connection lines 11 are preferably guided in opposite directions through the smoothing inductance elements 28.

FIG. 4D illustrates the situation with n=4 switching units. In order to save smoothing inductance elements 28, the number of smoothing inductance elements 28 is reduced compared to FIG. 4C. In this embodiment, each connection line 11 is guided with a further connection line 11 through a smoothing inductance element 28, for example a common mode choke. k−1 connection lines 11 being thereby routed with only exactly one further connection line 11 through a smoothing inductance element 28. Exactly one connection line 11, as shown here the k* connection line 11 of the output 9 with the designation U1, is however connected to two further connection lines 11, namely those of the outputs 9 with the designations U1 and U4, by a smoothing inductance element 28.

The arrangements of smoothing inductance elements 28 shown in FIGS. 4A-D may also be referred to as a smoothing inductance matrix.

FIG. 5 shows a simplified schematic of a switching unit 8, which is configured as an inverter unit 3. The inverter unit 3 has three outputs 9, wherein two switches 30 are associated with each output 9. The switches can be, for example, field-effect transistors or IGBTs (Insulated-Gate Bipolar Transistor).

The switching units 8 can be arranged on a common printed circuit board 31, as shown in FIG. 6. The connecting lines 11 and the smoothing inductance elements 28 may also be arranged on the common printed circuit board 31. The smoothing inductance elements 28 may be integrated into a terminal block with terminals (not shown) for the machine 2. The parallel connection of switching units 8 allows electrical machines 2 to be operated with higher power compared to the power of the individual switching units 8. If an electrical machine 2 has a lower output, it may be sufficient to connect fewer switching units 8 in parallel than those arranged on the common printed circuit board 31. If, for example, three switching units 8 are arranged on a printed circuit board 31, but only the parallel connection of two switching units 8 is required to operate an electrical machine 2, the third switching unit 8 can be used to operate a further electrical machine 2. This is in line with the universal applicability and scalability mentioned at the beginning, since only minor adjustments are necessary for such an operation, which is shown in FIG. 6. Thus, a common printed circuit board 31 with multiple switching units 8 can be manufactured in large numbers. Depending on the requirements, the circuitry of the printed circuit board 31 can then be easily adjusted.

The invention claimed is:

1. Injection moulding machine, comprising:
at least one electrical machine;
multiple electrically parallel-connected switching units, which are designed to drive the electrical machine, wherein each switching unit having at least one electrical output and at least one electrical switch associated with the output, which can be switched according to a switching pattern, wherein corresponding outputs of the switching units are electrically connected in parallel to a common output, which is connected to the electrical machine;

at least one primary open-loop and/or closed-loop control, which is designed to actuate the switching units with control signals, in order to operate the electrical machine;
a measuring device for measuring output currents at the outputs of the switching units; and
at least one correction controller, which is designed to adjust a corresponding control signal in the event of a deviation between a measured output current at an output and a target value for an output current, such that switching times, which are predetermined by the switching pattern, of at least one switch, which is associated with the relevant output, are shifted forwards or backwards in time and thereby the deviation between the target value and the output current is reduced, wherein the at least one correction controller is adjusted to synchronize switching times of switches, which are associated with corresponding outputs, such that these switch simultaneously, wherein,
corresponding outputs of the switching units are connected to the respective common outputs via connecting lines, wherein, in order to smooth the output currents, each connecting line is guided through a smoothing inductance element in opposite directions at least once together with the connecting line of another corresponding output.

2. Injection moulding machine according to claim 1, wherein, n switching units are provided and each output of at least n−1 switching units is associated with a respective correction controller, which adjusts a corresponding control signal when the measured output current at the output deviates from the target value.

3. Injection moulding machine according to claim 1, wherein the at least one correction controller is designed to apply an offset signal value to the control signal in order to adjust the control signal.

4. Injection moulding machine according to claim 1, wherein the switching units are configured as inverter units and each have at least two electrical outputs.

5. Injection moulding machine according to claim 1, wherein n switching units are provided and one of the switching units represents a reference switching unit and all outputs of the other n−1 switching units are each associated with a correction controller, wherein the correction controllers are designed in each case to adjust a control signal of the n−1 switching units in such a way that the output currents of the other n−1 switching units correspond to the respective corresponding output currents of the reference switching unit.

6. Injection moulding machine according to claim 1, wherein a correction controller is associated in each case with all outputs of all switching units, wherein the correction controllers are designed in each case to adjust a control signal of the switching units in such a way that the output currents of the switching units each correspond to an averaged total current from the respective output current and all corresponding output currents.

7. Injection moulding machine according to claim 1, wherein the connecting lines of corresponding outputs of the switching units are guided through a common mode choke or a self-contained, annular, magnetic core element as smoothing inductance element.

8. Injection moulding machine according to claim 1, the injection moulding machine for producing plastic parts, wherein the at least one electric machine is a synchronous motor, and the multiple electrically parallel-connected switching units are inverter units.

9. Injection moulding machine according to claim 3, wherein a memory, including a non-volatile memory, is provided, in which the offset signal value or a temporal average value thereof can be stored.

10. Method for synchronizing output currents of electrically parallel-connected switching units, which are connected to an electrical machine of an injection moulding machine, wherein each switching unit has at least one electrical output and at least one electrical switch associated with the output, which is switched according to a switching pattern, wherein corresponding outputs of the switching units are electrically connected in parallel to a common output for the electrical machine and the method has the following steps:

outputting control signals to the switching units;

measuring output currents at the outputs of the switching units;

comparing measured output currents with a target value for each output current;

adjusting a corresponding control signal by at least one correction controller in the event of a deviation between a measured output current at an output and a target value, such that switching times, which are predetermined by the switching pattern, of the at least one switch, which is associated with the relevant output, are shifted forwards or backwards in time and thereby reducing the deviation between the target value and the output current, wherein the at least one correction controller synchronizes switching times of switches, which are associated with corresponding outputs, such that these switch simultaneously, wherein, corresponding outputs of the switching units are connected to the respective common outputs via connecting lines, wherein in order to smooth the output currents each connecting line is guided through a smoothing inductance element in opposite directions at least once together with the connecting line of another corresponding output.

11. Method of claim 10, wherein the at least one correction controller applies an offset signal value to the control signal to adjust the control signal.

12. Method according to claim 10, wherein the offset signal value or a temporal average value thereof is stored in a memory, including a non-volatile memory, so that the offset signal value or its temporal average value is available when the method is used again.

13. Method according to claim 10, wherein n switching units are provided and one of the switching units represents a reference switching unit, wherein each output of the other $n-1$ switching units is associated with a correction controller and the target values of all output currents of the other $n-1$ switching units are formed by the output currents of the reference switching unit corresponding to the respective output currents of the other $n-1$ switching units.

14. Method according to claim 10, wherein a correction controller is associated with each output and for each output current an averaged total current of the respective output current and all corresponding output currents is used as target value.

* * * * *